United States Patent
Radhakrishnan et al.

(10) Patent No.: US 9,503,549 B2
(45) Date of Patent: Nov. 22, 2016

(54) REAL-TIME DATA ANALYSIS FOR RESOURCE PROVISIONING AMONG SYSTEMS IN A NETWORKED COMPUTING ENVIRONMENT

(71) Applicant: International Business Machines Corporation, Armonk, NY (US)

(72) Inventors: Rajesh Radhakrishnan, Reston, VA (US); Yih-Shin Tan, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 242 days.

(21) Appl. No.: 14/215,152

(22) Filed: Mar. 17, 2014

(65) Prior Publication Data

US 2014/0201362 A1    Jul. 17, 2014

Related U.S. Application Data

(63) Continuation of application No. 13/090,345, filed on Apr. 20, 2011, now abandoned.

(51) Int. Cl.
*H04L 29/08* (2006.01)
*G06F 9/50* (2006.01)

(52) U.S. Cl.
CPC ........... *H04L 67/322* (2013.01); *G06F 9/5061* (2013.01)

(58) Field of Classification Search
CPC ..................... H04L 67/322; G06F 9/5061
See application file for complete search history.

(56) References Cited

U.S. PATENT DOCUMENTS

| | | |
|---|---|---|
| 6,880,002 B2 | 4/2005 | Hirschfeld et al. |
| 7,516,457 B2 | 4/2009 | Eilam et al. |
| 7,574,496 B2 | 8/2009 | McCrory et al. |

(Continued)

OTHER PUBLICATIONS

M. Boniface et al., "Platform-as-a-Service Architecture for Real-Time Quality of Service Management in Clouds," Internet and Web Applications and Services (ICIW), 2010 Fifth International Conference on, Barcelona, 2010, pp. 155-160.*

(Continued)

*Primary Examiner* — Uzma Alam
(74) *Attorney, Agent, or Firm* — William H. Hartwell; Hunter E. Webb; Keohane & D'Alessandro PLLC

(57) ABSTRACT

Embodiments of the present invention provide an approach for intelligent service resource provisioning among distinct systems in a networked computing environment (e.g., a cloud computing environment). Specifically, the embodiments of the present invention provide an intelligent provisioning engine (hereinafter engine) that accesses a service intelligence repository that comprises configuration information pertaining to a set of service resources available on a set of systems. The engine may also receive/identify a set of rules pertaining to any constraints on the set of service resources as well as a set of policies pertaining to provisioning the set of service resources. Still yet, the engine can collect real-time data pertaining to operational characteristics of the set of service resources. Based on the information/data collected, the engine may determine a plan for provisioning the set of service resources and integrate the plan with ancillary systems/engines (e.g., scaling, provisioning, monitoring, etc.) for implementation of the plan.

25 Claims, 5 Drawing Sheets

(56) References Cited

U.S. PATENT DOCUMENTS

| | | |
|---|---|---|
| 7,630,877 B2 | 12/2009 | Brown et al. |
| 7,636,764 B1 | 12/2009 | Fein et al. |
| 7,904,540 B2 | 3/2011 | Hadad et al. |
| 7,912,955 B1 | 3/2011 | Machiraju et al. |
| 2009/0276771 A1 | 11/2009 | Nickolov et al. |
| 2009/0300107 A1* | 12/2009 | Araki ............... H04L 67/24 709/203 |
| 2010/0005175 A1* | 1/2010 | Swildens ............ G06F 9/50 709/226 |
| 2010/0057833 A1* | 3/2010 | DeHaan ............. H04L 67/34 709/203 |
| 2010/0061250 A1 | 3/2010 | Nugent |
| 2010/0088150 A1 | 4/2010 | Mazhar et al. |
| 2010/0125664 A1* | 5/2010 | Hadar ............. G06F 9/5072 709/224 |
| 2010/0262695 A1* | 10/2010 | Mays ............. G06F 9/5027 709/226 |
| 2010/0293602 A1* | 11/2010 | Uchida ............. G06F 21/00 726/4 |
| 2011/0047413 A1 | 2/2011 | McGill et al. |
| 2011/0066731 A1* | 3/2011 | Falken ............. G06F 9/505 709/226 |

OTHER PUBLICATIONS

"Amazon Virtual Private Cloud (Amazon VPC)", Amazon Web Services, http://aws.amazon.com/vpc/, Mar. 28, 2011, 4 pages.

Maitland, J., "Keeping Control Isn't Easy", Chapter 4: Cloud-Based Infrastructure, SearchCloudComputing.com, Publication Date: Oct. 2009, 19 pages.

"Amazon Virtual Private Cloud (Amazon VPC)", Amazon Web Services, http://aws.amazon.com/vpc/, 4 pages. Author unknown.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Doyle et al., "Model-Based Resource Provisioning in a Web Service Utility", USENIX Symposium on Internet Technologies and Systems, 2003, 14 pages.

Uzma Alam, USPTO Office Action, U.S. Appl. No. 13/090,345, Notification Date Mar. 29, 2013, 13 pages.

Uzma Alam, USPTO Final Office Action, U.S. Appl. No. 13/090,345, Notification Date Sep. 5, 2013, 18 pages.

Uzma Alam, USPTO Notice of Allowance and Fee(s) Due, U.S. Appl. No. 13/090,345, Date Mailed Dec. 23, 2013, 23 pages.

* cited by examiner

REAL-TIME DATA ANALYSIS FOR RESOURCE PROVISIONING AMONG SYSTEMS IN A NETWORKED COMPUTING ENVIRONMENT

CROSS-REFERENCE TO RELATED APPLICATIONS

The present application is a continuation of U.S. patent application Ser. No. 13/090,345, filed Apr. 20, 2011, entitled "REAL-TIME DATA ANALYSIS FOR RESOURCE PROVISIONING AMONG SYSTEMS IN A NETWORKED COMPUTING ENVIRONMENT", the disclosure of which is incorporated herein by reference.

TECHNICAL FIELD

The present invention generally relates to service resource provisioning. Specifically, the present invention relates to the intelligent, inter-system provisioning of service resources in a networked computing environment (e.g., a cloud computing environment).

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical computing engines, servers and devices, device memory, storage devices.

As enterprises develop their information technology (IT) strategy, and as technologies evolve to enable location of services in a multi-data center configuration, there is a need for inter-data center and inter-cloud provisioning capabilities. However, challenges exist with respect to making inter-system data and policy-driven decisions to take provisioning actions.

SUMMARY

Embodiments of the present invention provide an approach for intelligent service resource provisioning among distinct systems in a networked computing environment (e.g., a cloud computing environment). Specifically, the embodiments of the present invention provide an intelligent provisioning engine (hereinafter engine) that accesses a service intelligence repository that comprises configuration information pertaining to a set of service resources available on a set of systems. The engine may also receive/identify a set of rules pertaining to any constraints on the set of service resources as well as a set of policies pertaining to provisioning the set of service resources. Still yet, the engine can collect real-time data pertaining to operational characteristics of the set of service resources. Based on the information/data collected, the engine may determine a plan for provisioning the set of service resources and integrate the plan with ancillary systems/engines (e.g., scaling, provisioning, monitoring, etc.) for implementation of the plan.

A first aspect of the present invention provides a method for provisioning service resources based on real-time data in a networked computing environment, comprising: accessing a service intelligence repository, the service intelligence repository comprising configuration information pertaining to a set of service resources available on a set of systems; identifying a set of rules pertaining to any constraints on the set of service resources based on a characteristic associated with the set of service resources, the set of rules for each service resource including a plurality of rules, at least one of the plurality of rules being unrelated to performance of the set of service resources; identifying a set of policies pertaining to provisioning the set of service resources based on a factor associated with the set of service resources, the set of policies for each service resource including a plurality of policies, at least one of the plurality of policies being unrelated to quality of service of the set of service resources; collecting real-time data pertaining to monitored operational characteristics of the set of service resources from an end-to-end service monitoring and management system, a load balancing system, and an intelligent risk engine; and determining a plan for provisioning the set of service resources between the set of systems, the plan being generated based upon the set of rules, the set of policies, and the real-time data.

A second aspect of the present invention provides a system for provisioning service resources based on real-time data in a networked computing environment, comprising: a bus; a processor coupled to the bus; and a memory medium coupled to the bus, the memory medium comprising instructions to: access a service intelligence repository, the service intelligence repository comprising configuration information pertaining to a set of service resources available on a set of systems; identify a set of rules pertaining to any constraints on the set of service resources based on a characteristic associated with the set of service resources, the set of rules for each service resource including a plurality of rules, at least one of the plurality of rules being unrelated to performance of the set of service resources; identify a set of policies pertaining to provisioning the set of service resources based on a factor associated with the set of service resources, the set of policies for each service resource including a plurality of policies, at least one of the plurality of policies being unrelated to quality of service of the set of service resources; collect real-time data pertaining to monitored operational characteristics of the set of service resources; and determine a plan for provisioning the set of service resources between the set of systems, the plan being generated based upon the set of rules, the set of policies, and the real-time data.

A third aspect of the present invention provides a computer program product for provisioning service resources based on real-time data in a networked computing environment, the computer program product comprising a computer readable storage device, and program instructions stored on the computer readable storage device, to: access a service intelligence repository, the service intelligence repository comprising configuration information pertaining to a set of service resources available on a set of systems; identify a set of rules pertaining to any constraints on the set of service resources based on a characteristic associated with the set of service resources, the set of rules for each service resource including a plurality of rules, at least one of the plurality of rules being unrelated to performance of the set of service resources; identify a set of policies pertaining to provisioning the set of service resources based on a factor associated with the set of service resources, the set of policies for each service resource including a plurality of policies, at least one of the plurality of policies being unrelated to quality of service of the set of service resources; collect real-time data pertaining to monitored operational characteristics of the set of service resources; and determine a plan for provisioning the set of service resources between the set of systems, the plan being generated based upon the set of rules, the set of policies, and the real-time data.

A fourth aspect of the present invention provides a method for deploying a system for provisioning service resources based on real-time data in a networked computing environment, comprising: providing a computer infrastructure being operable to: access a service intelligence repository, the service intelligence repository comprising configuration information pertaining to a set of service resources available on a set of systems; identify a set of rules pertaining to any constraints on the set of service resources based on a characteristic associated with the set of service resources, the set of rules for each service resource including a plurality of rules, at least one of the plurality of rules being unrelated to performance of the set of service resources; identify a set of policies pertaining to provisioning the set of service resources based on a factor associated with the set of service resources, the set of policies for each service resource including a plurality of policies, at least one of the plurality of policies being unrelated to quality of service of the set of service resources; collect real-time data pertaining to monitored operational characteristics of the set of service resources; and determine a plan for provisioning the set of service resources between the set of systems, the plan being generated based upon the set of rules, the set of policies, and the real-time data.

BRIEF DESCRIPTION OF THE DRAWINGS

These and other features of this invention will be more readily understood from the following detailed description of the various aspects of the invention taken in conjunction with the accompanying drawings in which.

Figure 1:
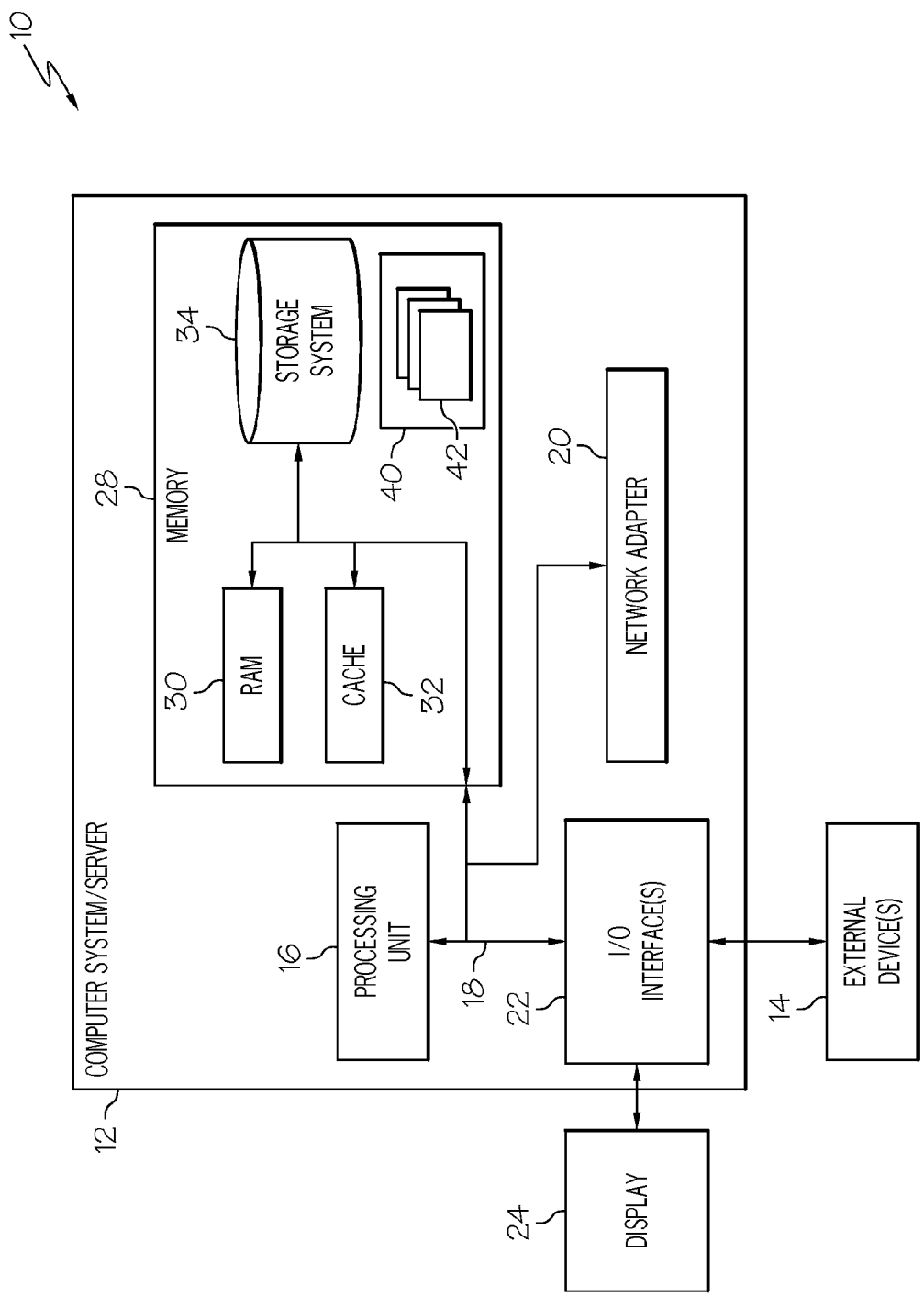
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for intelligent service resource provisioning among distinct systems in a networked computing environment (e.g., a cloud computing environment). Specifically, the embodiments of the present invention provide an intelligent provisioning engine (hereinafter engine) that accesses a service intelligence repository that comprises configuration information pertaining to a set of service resources available on a set of systems. The engine may also receive/identify a set of rules pertaining to any constraints on the set of service resources as well as a set of policies pertaining to provisioning the set of service resources. Still yet, the engine can collect real-time data pertaining to operational characteristics of the set of service resources. Based on the information/data collected, the engine may determine a plan for provisioning the set of service resources and integrate the plan with ancillary systems/engines (e.g., scaling, provisioning, monitoring, etc.) for implementation of the plan.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
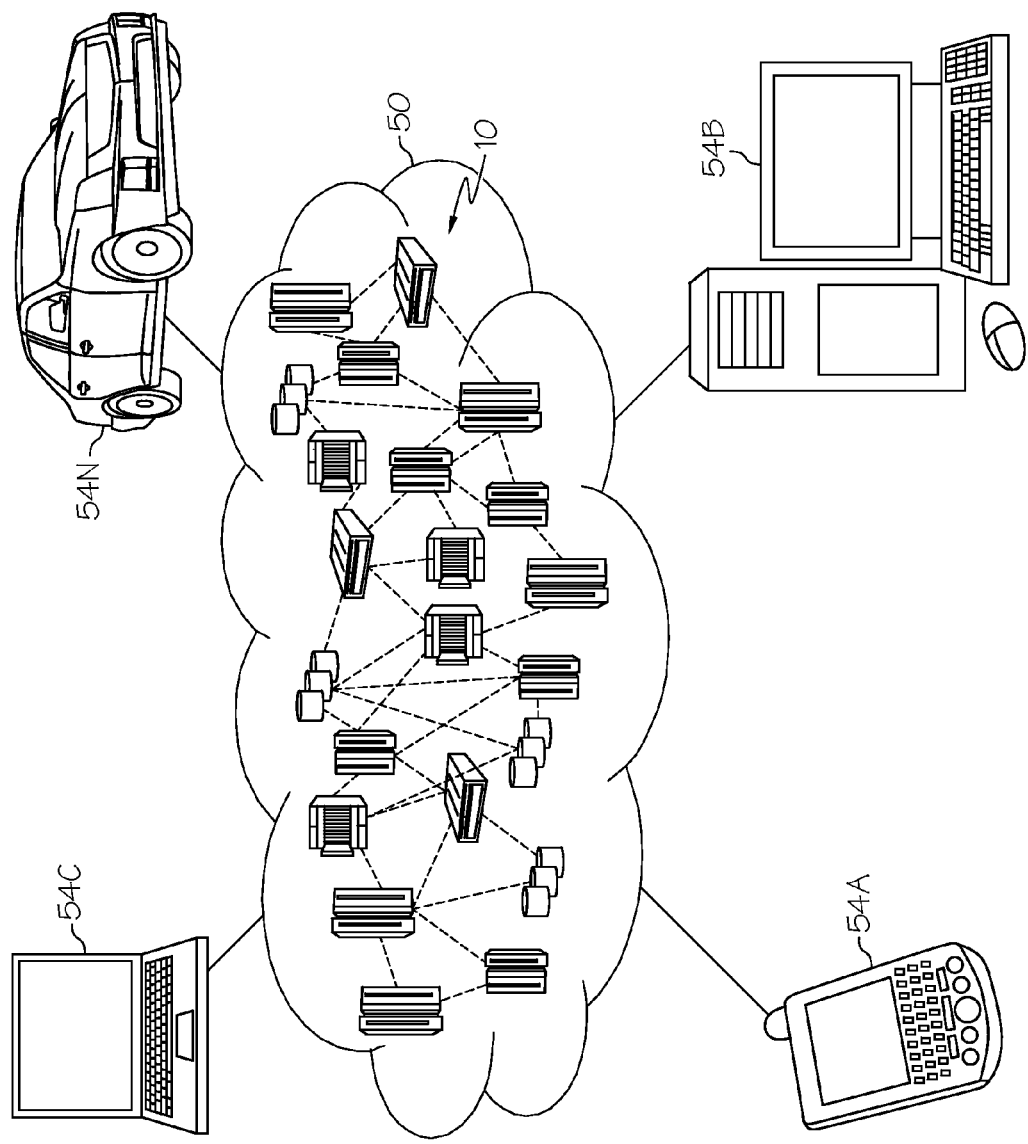
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
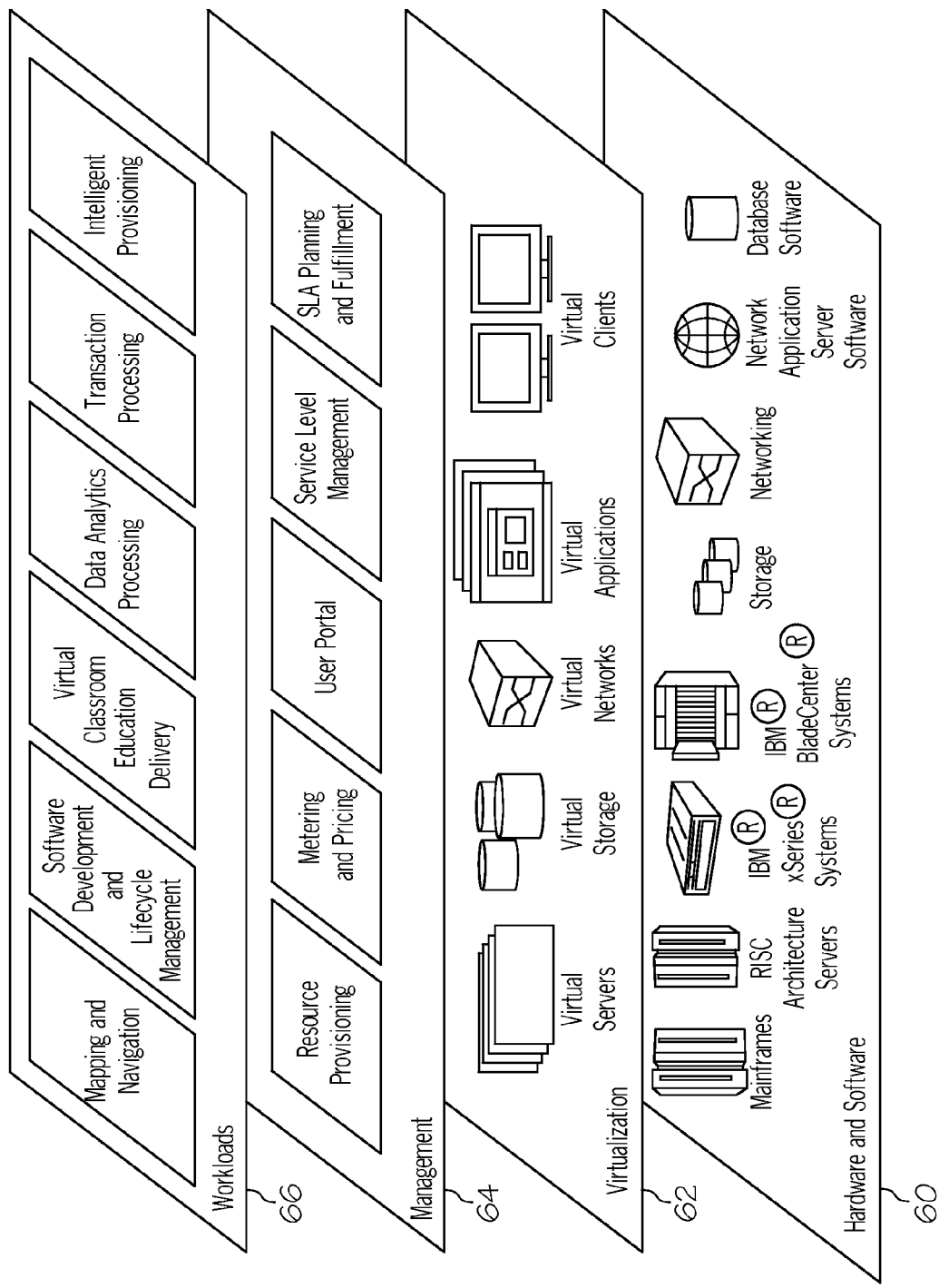
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and intelligent provisioning. As mentioned above, all of the foregoing examples described with respect to FIG. 3 are illustrative only, and the invention is not limited to these examples.

It is understood all that functions of the present invention as described herein typically may be performed by the intelligent provisioning functionality, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

In general, the embodiments of the present invention comprise one or more of the following steps:

1. Development of and/or access to a service intelligence repository that has data pertaining to: service and/or service resource configuration including configuration Items (hardware and software) dedicated for a service/resource, or shared by the service/resource (with other services/resource). This can include the physical location of hardware and/or software resources. This step can further include the identification and/or mapping of any provisioning systems that can automatically provision and allocate physical and/or virtual services/resources (e.g., SAAS, IAAS, PAAS, etc.).

2. Identify and develop rules pertaining to constraints associated with services, service components, and service resource provisioning such as:

Service and service component related constraints such as compatibility constraints (e.g., only certain vendor resources and resource version levels are compatible with the service and other service components);

Resource pools that can be used;

Locations from where service components and service resources can be provisioned;

Manual versus automated provisioning;

Thin versus thick provisioning (granularity of resource units); and/or

Allocation related constraints.

3. Identify and develop rules pertaining to policies associated with resource provisioning such as:

Rules associated with co-location of service resources (e.g., whether storage systems containing database (DB) tables and associated DB servers need to be physically co-located);

Rules determining whether web server and web-caching systems need to be located close to where the end users are located; and/or Rules associated with provisioning due to risk factors (e.g., capital resource availability, disaster recovery (DR) considerations, etc.).

4. Collect real-time data about operational characteristics (e.g., service traffic) and other service resource provisioning related information from:

End-to-end service monitoring and management systems (including capacity/utilization and performance monitoring tools, availability monitoring tools, etc.);

Load balancing systems (such as Internet protocol (IP) load balancers); and/or

Intelligent risk engine(s) (e.g., about risk data associated with potential DR scenarios).

5. Develop/determine a plan for provisioning the set of service resources between the set of systems based on the collected information.

6. Integrate the plan with intelligent scaling engine(s) to check if the resource can be scaled up or down if necessary (e.g., vertical scaling of service component or service resources before provisioning and allocating additional resources).

7. Integrate the plan with individual (e.g., resource specific) provisioning tools (e.g., service and service resource provisioning tools).

8. Make determinations based on the plan and its input such as:

Real time service demand and utilization data;

Service demand and utilization data patterns and trends;

End user location(s);

Service component and service resource locations;

Service and resource provisioning constraints; and/or

Service and resource provisioning policies (e.g., policies can come from a capacity management system such as an IT process with provisioning and allocation operations such as sub-processes or related IT process domains).

9. Implement/take specific action(s) on these determinations (e.g., the plan) via remote commands to individual provisioning tools located at each data center or directly interfacing with the resource/resource pools at different data centers.

Figure 4:
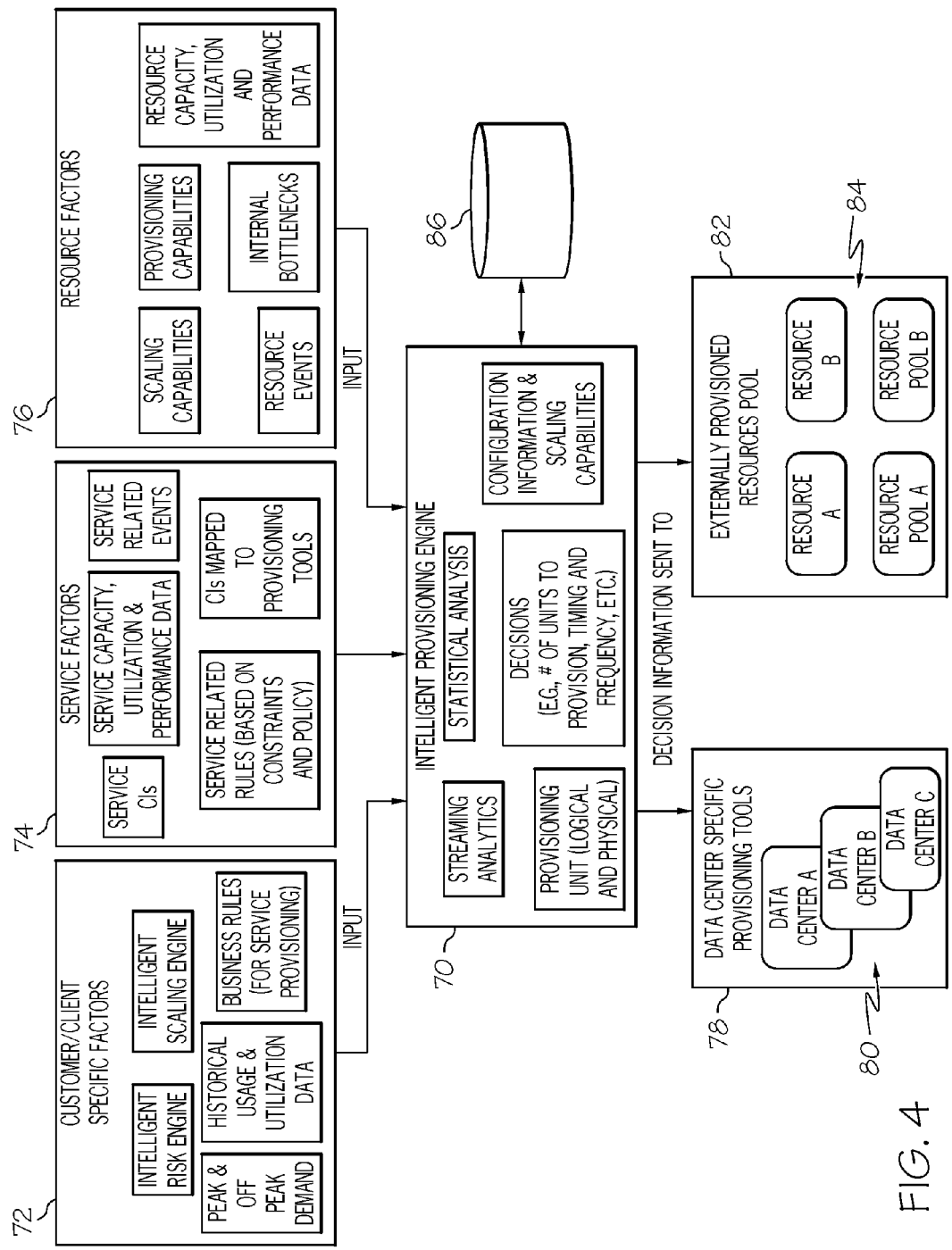
FIG. 4 depicts a system diagram according to an embodiment of the present invention.

Referring now to FIG. 4, a system diagram according to an embodiment of the present invention is shown. As depicted, an intelligent provisioning engine (engine 70) (e.g., also represented by one or more modules 42 of program/utility 40 of FIG. 1) is provided. As indicated above, engine 70 will access various types of information to intelligently provision service resources 84 (shown in provisioned resource pool 82) that may be available among a set of systems 80 (e.g., separate and distinct data centers shown in provisioning tools 78). Thus, the embodiments described herein provide an approach for inter-system (e.g., inter-cloud) service resource provisioning.

As shown, engine 70 will access various types and/or sources of information. One such source is service intelligence repository 86 from which engine 70 can obtain configuration information pertaining to the set of service resources 84 available on set of systems 80. As further shown, engine 70 will further receive input in the form of:

Client specific factors 72 (e.g., intelligent risk engine data, intelligent scaling engine data, demand data, historical usage data, and rules for service provisioning;

Service factors 74 (e.g., service continuous integration (CI), service capacity utilization and performance data; service related events; service resource related rules and/or policies, and/or mapping data); and/or Resource factors 76 (e.g., resource scaling capabilities, resource provisioning capabilities, resource capacity utilization and performance data (e.g., operational characteristics); resource events; and internal bottleneck data.

As indicated, multiple types of information/data received by engine 70 are a set of rules pertaining to any constraints on the set of service resources, a set of policies pertaining to provisioning the set of service resources, and real-time data (e.g., streaming analytics) pertaining to operational characteristics of the set of service resources. Under embodiments of the present invention, the set of rules can further pertain to at least one of the following: available resource pools, locations from where the set of service resources can be provisioned, a capability for the set of services resources to be automatically provisioned, or a granularity of the set of service resources. Moreover, the set of policies can further pertain to at least one of the following: co-location of the set of service resources, or a set of risk factors. Still yet, the real-time data can further pertain to at least one of the following: service traffic through the set of service resources, monitoring and management systems associated with the set of service resources, or load balancing systems associated with the set of service resources. Shown below are examples of a policies and rules:

Example 1 for a policy: Allocation of resources should align resource tiers (and associated resource pool) to service tier (service level tier).

Example 2 for a policy: A bank customer's account information, particularly customer personal data such as social security number, address, contact information, name, family information, etc. should only be stored in the storage clouds located within the geographic region "A".

Example 1 for a rule: High end or premium storage pools (e.g., using higher cost, high performance, and/or highly resilient storage resources) should only be used for allocating storage resources to Tier "X" services (e.g., that have very stringent SLAs and severe penalties for breaching SLAs).

Example 2 for a rule: Provisioning of any database or file system (physical or virtual) which contains or may contain customer sensitive private information including social security number should only be stored in enterprise storage private cloud A, B and C (e.g., all of which are located within geographic region "A").

Based on the information collected, engine 70 will perform an analysis (e.g., statistical) to develop/determine/generate a plan to intelligently provision the set of service resources 84 between set of systems 80. In developing the plan, engine 70 will make various decisions/determinations (e.g., the number of units to provision, the timing and frequency thereof, etc.). Moreover, engine 70 can integrate the plan with at least one scaling engine and/or at least one resource provisioning tool for implementation. In general, the plan can be generated so that the rules, policies, and any applicable service level agreement (SLA) terms are followed appropriately, while providing the most efficient and effective use of service resources. Along these lines, engine 70 can include a rules engine or the like that can apply rules, policies and real-time data. As such, one or more of the following items can result from the rules engine:

(A) A plan (e.g., a document, and XML file, etc.) that can be reviewed, approved and implemented manually;

(B) A plan that can be approved and implemented automatically (i.e., pre-approved—similar to pre-approved changes via interfacing with provisioning tools); and/or (C) A combination of manual and automated actions (e.g., manual review and approval with automated implementation).

ILLUSTRATIVE EXAMPLE

Shown below is an illustrating template for a provisioning and allocation plan according to an embodiment of the present invention:

I. Resource Details
  Resource (Configuration Item) Class: Server.
  Resource (CI) Type: Virtual Server or Virtual Machine (VM).
  Resource (CI) Vendor: VMware (example).
  Resource Pool Name: Ecommerce Production Pool E (example).
II. Provisioning Details
  Resource Provisioning Tool Vendor: Acme.
  Resource Provisioning Tool: Acme Data Center.
  Provisioning Tool Version: Version 1.2.
  Provisioning Server Name: Acme_VMWare_Prov_HostA and HostB. (backup to A)
III. Service Details
  Service to which Resource being allocated to: Ecommerce Presentation Service.
  Reason for provisioning and allocation: Performance (one of many choices).
III. Resource Configuration Details
  Resource Configuration Data Source: Production Instance
  A. Resource Configuration File Location: Directory and File name in CMDB.
  Resource-Image File Name: EComm-Production-PoolE.vmdk (Example of vmdk file).
  Resource-Image File Source (Host Name and Source Directory): Image Management System A: IMSA:/image/production_images/.
IV. Procedural Details
  Method to Use Image and Configuration File: Provisioning and Allocation Script for VMware VM located in the administrative home directory of the Provisioning Server.
  Post Provisioning Procedure: Script to allocate and assign new instance of VM to the current service (ecommerce presentation services in this case) located in the administrative home directory of the provisioning server.
V. Engine Details
  Provisioning Engine: Production-Provisioning-EngineA.
  XML file from Provisioning Engine (with this data): VMware_Prov.xml.
  Source of xml file: Production-Provisioning-EngineA.
  Target of xml file: Acme_VMWare_Prov_HostA and HostB.
VI. Scheduling Details
  Time to Provision: Scheduled via Cron (daily provisioning job which runs during provisioning window—off peak hours).
  Exception for Window: Yes or No (Rule for immediate provisioning i.e., do not wait for the next window).
VI. Notification Details
  Notification to: VMware_admin (alias).
  Notification time: one hour and one minute before and after provisioning and allocation.

Figure 5:
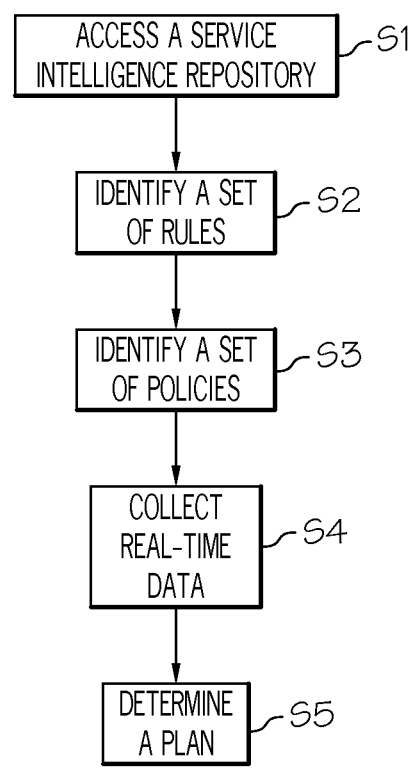
FIG. 5 depicts a method flow diagram according to an embodiment of the present invention.

Referring now to FIG. 5, a method flow diagram according to embodiments of the present invention is shown. In step S1, a service intelligence repository is accessed. In general, the service intelligence repository comprises configuration information pertaining to a set of service resources available on a set of systems. In step S2, a set of rules pertaining to any constraints on the set of service resources is identified. In step S3, a set of policies pertaining to provisioning the set of service resources is identified. In step S4, real-time data pertaining to operational characteristics of the set of service resources is collected. In step S5, a plan for provisioning the set of service resources between the set of systems is determined. As indicated above, the plan is typically generated based upon the set of rules, the set of policies, and the real-time data. Moreover, the plan will be integrated with at least one scaling engine and/or at least one resource provisioning tool for implementation.

While shown and described herein as an intelligent provisioning solution, it is understood that the invention further provides various alternative embodiments. For example, in one embodiment, the invention provides a computer-readable/useable medium that includes computer program code to enable a computer infrastructure to provide intelligent provisioning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide intelligent provisioning functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for intelligent provisioning. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for provisioning service resources based on real-time data in a networked computing environment, comprising:
    accessing a service intelligence repository, the service intelligence repository comprising configuration information pertaining to a set of service resources available on a set of systems;
    identifying a set of rules pertaining to any constraints on the set of service resources based on a characteristic associated with the set of service resources, the set of rules for each service resource including: compatibility restraints for the service resource, resource pools that can be used in conjunction with the service resource, location from which the service resource can be provisioned, whether the service resource must be manually provisioned, whether thick provisioning should be used in conjunction with the service resource, and allocation related constraints for the service resource;
    identifying a set of policies pertaining to provisioning the set of service resources based on a factor associated with the set of service resources, the set of policies for each service resource including: whether the service resource must be physically co-located with another service resource, a distance from end users that the service resource must reside, and considerations that must be taken due to risk factors;
    collecting real-time data pertaining to monitored operational characteristics of the set of service resources from an end-to-end service monitoring and management system, a load balancing system, and an intelligent risk engine; and
    implementing a plan for provisioning the set of service resources between the set of systems, the plan being generated based upon the set of rules, the set of policies, and the real-time data.

2. The method of claim 1, the set of systems comprising a plurality of systems, and the plan comprising a plan for provisioning the set of service resources among the plurality of systems.

3. The method of claim 1, the service intelligence repository further comprising a map of the set of service resources.

4. The method of claim 1, the set of rules further pertaining to at least one of the following: available resource pools, locations from where the set of service resources can be provisioned, a capability for the set of services resources to be automatically provisioned, or a granularity of the set of service resources.

5. The method of claim 1, the set of policies further pertaining to at least one of the following: co-location of the set of service resources, or a set of risk factors.

6. The method of claim 1, the real-time data further pertaining to at least one of the following: service traffic through the set of service resources, monitoring and management systems associated with the set of service resources, or load balancing systems associated with the set of service resources.

7. The method of claim 1, further comprising:
integrating the plan with at least one scaling engine; and
integrating the plan with at least one resource provisioning tool.

8. The method of claim 7, further comprising implementing the plan to provision the set of service resources among the set of systems using the at least one scaling engine and the at least one resource provisioning tool.

9. A system for provisioning service resources based on real-time data in a networked computing environment, comprising:
a bus; a processor coupled to the bus; and
a memory device coupled to the bus, the memory device comprising instructions to
access a service intelligence repository, the service intelligence repository comprising configuration information pertaining to a set of service resources available on a set of systems;
identify a set of rules pertaining to any constraints on the set of service resources based on a characteristic associated with the set of service resources, the set of rules for each service resource including: compatibility restraints for the service resource, resource pools that can be used in conjunction with the service resource, location from which the service resource can be provisioned, whether the service resource must be manually provisioned, whether thick provisioning should be used in conjunction with the service resource, and allocation related constraints for the service resource;
identify a set of policies pertaining to provisioning the set of service resources based on a factor associated with the set of service resources, the set of policies for each service resource including: whether the service resource must be physically co-located with another service resource, a distance from end users that the service resource must reside, and considerations that must be taken due to risk factors;
collect real-time data pertaining to monitored operational characteristics of the set of service resources; and
implement a plan for provisioning the set of service resources between the set of systems, the plan being generated based upon the set of rules, the set of policies, and the real-time data.

10. The system of claim 9, the set of systems comprising a plurality of systems, and the plan comprising a plan for provisioning the set of service resources among the plurality of systems.

11. The system of claim 9, the service intelligence repository further comprising a map of the set of service resources.

12. The system of claim 9, the set of rules further pertaining to at least one of the following: available resource pools, locations from where the set of service resources can be provisioned, a capability for the set of service resources to be automatically provisioned, or a granularity of the set of service resources.

13. The system of claim 9, the set of policies further pertaining to at least one of the following: co-location of the set of service resources, or a set of risk factors.

14. The system of claim 9, the real-time data further pertaining to at least one of the following: service traffic through the set of service resources, monitoring and management systems associated with the set of service resources, or load balancing systems associated with the set of service resources.

15. The system of claim 9, the memory medium further comprising instructions to:
integrate the plan with at least one scaling engine; and
integrate the plan with at least one resource provisioning tool.

16. The system of claim 15, the memory medium further comprising instructions to implement the plan to provision the set of service resources among the set of systems using the at least one scaling engine and the at least one resource provisioning tool.

17. A computer program product for provisioning service, resources based on real-time data in a networked computing environment, the computer program product comprising a computer readable storage device, and program instructions stored on the computer readable storage device, to:
access a service intelligence repository, the service intelligence repository comprising configuration information pertaining to a set of service resources available on a set of systems;
identify a set of rules pertaining to any constraints on the set of service resources based on a characteristic associated with the set of service resources, the set of rules for each service resource including: compatibility restraints for the service resource, resource pools that can be used in conjunction with the service resource, location from which the service resource can be provisioned, whether the service resource must be manually provisioned, whether thick provisioning should be used in conjunction with the service resource, and allocation related constraints for the service resource;
identify a set of policies pertaining to provisioning the set of service resources based on a factor associated with the set of service resources, the set of policies for each service resource including: whether the service resource must be physically co-located with another service resource, a distance from end users that the service resource must reside, and considerations that must be taken due to risk factors;
collect real-time data pertaining to monitored operational characteristics of the set of service resources; and
implement a plan for provisioning the set of service resources between the set of systems, the plan being generated based upon the set of rules, the set of policies, and the real-time data.

18. The computer program product of claim 17, the set of systems comprising a plurality of systems, and the plan comprising a plan for provisioning the set of service resources among the plurality of systems.

19. The computer program product of claim 17, the service intelligence repository further comprising a map of the set of service resources.

20. The computer program product of claim 17, the set of rules further pertaining to at least one of the following: available resource pools, locations from where the set of service resources can be provisioned, a capability for the set of services resources to be automatically provisioned, or a granularity of the set of service resources.

21. The computer program product of claim 17, the set of policies further pertaining to at least one of the following: co-location of the set of service resources, or a set of risk factors.

22. The computer program product of claim 17, the real-time data further pertaining to at least one of the following: service traffic through the set of service resources, monitoring and management systems associated with the set of service resources, or load balancing systems associated with the set of service resources.

23. The computer program product of claim 17, further comprising program instructions stored on the computer readable storage media to:
  integrate the plan with at least one scaling engine; and
  integrate the plan with at least one resource provisioning tool.

24. The computer program product of claim 23, further comprising program instructions stored on the at least one computer readable storage media to provision the set of service resources among the set of systems using the at least one scaling engine and the at least one resource provisioning tool.

25. A method for deploying a system for provisioning service resources based on real-time data in a networked computing environment, comprising:
  providing, a computer infrastructure being operable to:
  access a service intelligence repository, the service intelligence repository comprising configuration information pertaining to a set of service resources available on a set of systems; identify a set of rules pertaining to any constraints on the set of service resources based on a characteristic associated with the set of service resources, the set of rules for each service resource including: compatibility restraints for the service resource, resource pools that can be used in conjunction with the service resource, location from which the service resource can be provisioned, whether the service resource must be manually provisioned, whether thick provisioning should be used in conjunction with the service resource, and allocation related constraints for the service resource;
  identify a set of policies pertaining to provisioning the set of service resources based on a factor associated with the set of service resources, the set of policies for each service resource including: whether the service resource must be physically co-located with another service resource, a distance from end users that the service resource must reside, and considerations that must be taken due to risk factors;
  collect real-time data pertaining to monitored operational characteristics of the set of service resources; and
  implement a plan for provisioning the set of service resources between the set of systems, the plan being generated based upon the set of rules, the set of policies, and the real-time data.

* * * * *